US010956512B2

(12) United States Patent
Li et al.

(10) Patent No.: US 10,956,512 B2
(45) Date of Patent: Mar. 23, 2021

(54) DOCUMENT LINK MIGRATION (71) Applicant: QUEST SOFTWARE INC., Aliso Viejo, CA (US)

(72) Inventors: Lin Li, Zhuhai (CN); Xing Wu, Hong Kong (CN); Konstantin Andreevich Vlasenko, Kanata (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 697 days.

(21) Appl. No.: 14/938,580

(22) Filed: Nov. 11, 2015

(65) Prior Publication Data
US 2017/0132222 A1    May 11, 2017

(51) Int. Cl.
*G06F 16/93* (2019.01)

(52) U.S. Cl.
CPC .................... *G06F 16/94* (2019.01)

(58) Field of Classification Search
CPC ............................ G06F 17/30014; G06F 16/94
See application file for complete search history.

(56) References Cited

U.S. PATENT DOCUMENTS

| 6,381,637 | B1 * | 4/2002 | Kamada | H04N 21/4622 |
| | | | | 709/218 |
| 6,886,014 | B1 * | 4/2005 | Dasgupta | G06F 17/30014 |
| 7,290,205 | B2 * | 10/2007 | Moncsko | G06F 17/30882 |
| | | | | 707/E17.013 |
| 8,838,727 | B2 * | 9/2014 | Astle | G06F 17/303 |
| | | | | 709/214 |
| 2006/0015697 | A1 * | 1/2006 | Morishita | G06F 3/0607 |
| | | | | 711/162 |
| 2008/0147687 | A1 * | 6/2008 | Furukawa | G06F 3/03545 |
| 2008/0281754 | A1 * | 11/2008 | Kelley | G06F 17/30887 |
| | | | | 705/39 |
| 2012/0030247 | A1 * | 2/2012 | Yambal | G06F 17/30079 |
| | | | | 707/802 |
| 2013/0332928 | A1 * | 12/2013 | Ishizawa | G06F 9/44 |
| | | | | 718/100 |
| 2014/0188869 | A1 * | 7/2014 | Beckmann | G06F 17/30079 |
| | | | | 707/736 |
| 2016/0321252 | A1 * | 11/2016 | Zhu | G06F 16/2228 |

OTHER PUBLICATIONS

Rouse, SearchDataCenter.com parallel processing, 2 pages, Mar. 27 (Year: 2007).*

* cited by examiner

*Primary Examiner* — Albert M Phillips, III
(74) *Attorney, Agent, or Firm* — Maschoff Brennan (57) ABSTRACT

Techniques and systems for migrating links in documents are described. For example, during a migration process, a first document may be selected to be migrated from a source document database. A determination may be made that the first document includes a link to a second document. The first document may be migrated to a target document database. The second document may be selected to be migrated from the source document database. The second document may be migrated to the target document database. The link in the first document may be finalized to include an address of the second document in the target document database.

18 Claims, 7 Drawing Sheets

DOCUMENT LINK MIGRATION

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A document stored in a document database may include links (e.g., hyperlinks) that reference other documents stored in the document database. When migrating applications from a first (e.g., source) document database to a second (e.g., target) document database, documents associated with the applications may be also be migrated. The migration process may include migrating the document links in each of the documents that are being migrated. After the documents have been migrated, the document links in each migrated document are modified to reference the other migrated documents in the target platform. Migrating links in documents is referred to as document link tracking and is a time-consuming and computing resource intensive process. Conventional migration products typically require that a user (e.g., a system administrator) exercise manual control over the document link tracking process. However, manual control over document link tracking may make the migration process complex and error-prone for the user. In addition, the document link tracking may place a significant demand on local computing resources.

SUMMARY

This Summary provides a simplified form of concepts that are further described below in the Detailed Description. This Summary is not intended to identify key or essential features and should therefore not be used for determining or limiting the scope of the claimed subject matter.

Techniques and systems for migrating links in documents are described. For example, during a migration process, a first document may be selected to be migrated from a source document database. A determination may be made that the first document includes a link to a second document. The first document may be migrated to a target document database. The second document may be selected to be migrated from the source document database. The second document may be migrated to the target document database. The link in the first document may be finalized to include an address of the second document in the target document database.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein provide a link tracking service that may be used to perform link tracking in parallel with a migration process (e.g., to migrate documents from a source document database to a target document database). The source document database and the target document database may include different types of documents, such as word processing documents (e.g., Microsoft® Word®, Lotus® Word Pro, or the like), spreadsheet documents (e.g., Microsoft® Excel®, Lotus® 123, or the like), presentation documents (e.g., Microsoft® PowerPoint®, Lotus® Freelance Graphics, or the like), electronic mail (email) documents (e.g., Microsoft® Outlook®, or the like), etc. In contrast, in a conventional link tracking system, links may be resolved after documents have been migrated, resulting in a lengthy migration process. The systems and techniques described herein can easily be integrated into an existing migration product and can reduce the demand on local computing resources by using on-demand computing resources provided via the cloud. Conventional link tracking, which is typically a manual process performed by a user, the systems and techniques described herein enable link tracking to be performed automatically (e.g., without human interaction). The systems and techniques described herein may include (i) a link discovery agent to discover, during the migration of each document, links in each document, (ii) a migration tracking system to track the migration of documents and to track the migration of the links in each of the documents, (iii) a link finalizing agent to finalize the links in the migrated documents, and a (iv) a dashboard to provide a current status (e.g., a snapshot) of the migration process. The migration tracking system may be hosted in a cloud-based environment that provides resources (e.g., data storage resources and computational resources) to recalculate the links, thereby placing little or no demand on local resources. Because the resources are provided by a cloud-based environment, the resources may be provided on-demand, e.g., based on usage. The migration tracking system may support multiple clients (e.g., multi-tenant) to enable multiple migrations for multiple enterprises to take place simultaneously (e.g., substantially in parallel).

While some of the examples provided herein describe migrating documents from a Lotus Notes® based (e.g., source) document database to a Microsoft® SharePoint® based (e.g., target) document database, the systems and techniques described herein may be used to migrate any type of document that includes links to other documents from any type of source document database to any type of target document database. Thus, the systems and techniques are not restricted to migrating Lotus Notes® documents or SharePoint® documents.

Figure 1:
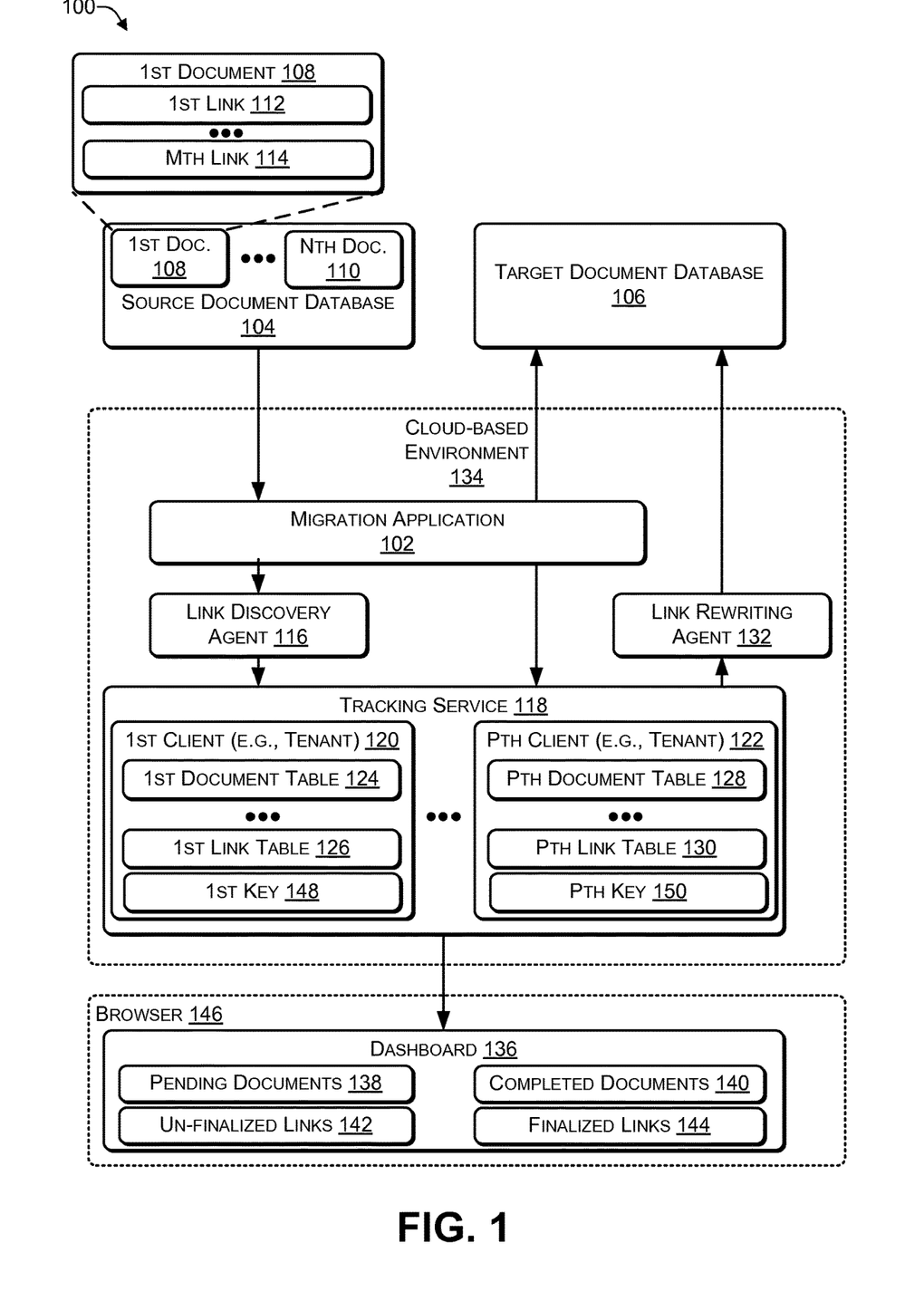
FIG. 1 is a block diagram illustrating an exemplary architecture to migrate documents and links in the documents according to some embodiments.

FIG. 1 is a block diagram illustrating an exemplary architecture 100 to migrate documents and links in the documents according to some embodiments. The architecture 100 includes a migration application 102 with access to a source document database 104 (e.g., Lotus Notes®) and to a target document database 106 (e.g., SharePoint®). The source document database 104 may be hosted by a server associated with a corporation (e.g., an enterprise) and may be customer premises equipment (CPE) that is located on-site at a location associated with the corporation or the server may be located offsite, e.g., at a data center or cloud-based computing resource provider. The target document database 106 may be hosted by a CPE-based server or the server may be located offsite, e.g., at a data center or cloud-based computing resource provider.

The migration application 102 may be used to migrate a set of N documents, such as a first document 108 to an Nth document 110 (where N>1), from the source document database 104 to the target document database 106. Each of the documents 108, 110 may include a set of zero or more links to other documents in the source document database 104. For example, the 1st document 108 may include a first link 112 to an Mth link 114 (where M>1 and M is not necessarily equal to N). In some cases, during the migration process, the migration application 102 may convert a format of one or more of the documents 108, 110 from a first format (e.g., Lotus® Notes®) to a second format (e.g., Microsoft® SharePoint®).

A link discovery agent 116 may discover links (e.g., the links 112, 114) in the documents 108, 110 that are being migrated by the migration application 102 and provide the links to a tracking service 118. The link discovery agent 116 may be incorporated into the functionality of the migration application 102 or the link discovery agent 116 may be a separate software application that works substantially in parallel with the migration application 102.

The document tracking service 114 may track a status of the documents being migrated and a status of each of the links in each document that are being migrated and may do so for more than one client, e.g., the document tracking service 114 may support multi-tenancy and keep track of the document migration and link migration for multiple clients, such as a first client 120 to a Pth client 122 (where P>1, and P not necessarily equal to M and N). For example, the source document database 104 and the target document database 106 may be associated with the first client 120. In this example, during the migration of the source document database 104 associated with the first client 120, the document tracking service 114 may add information associated with the documents 108, 110 to a document table 124 and may add information associated with links in the documents 108, 110 to a first link table 126. During the migration of a source document database associated with a Pth client, the document tracking service 114 may add information associated with the documents of the Pth client to a Pth document table 128 and may add information associated with links in the documents of the Pth client to a Pth link table 130. As illustrated in FIG. 1, the tables 124, 126, 128, 130 are merely examples of data structures that may be used to store information associated with the documents and the links in each document. It should be understood that in other implementations, other types of data structures (e.g., linked list, etc.) may be used to store information associated with the documents and the links in each document.

During the migration of the documents 108, 110 from the source document database 104 to the target document database 106, a link rewriting agent 132 may identify the links in the link tables 126, 130 that are to be updated (e.g., based on whether the document referenced by the link has been migrated) and modify (e.g., rewrite) the links to reference documents in the target document database 106. For example, before migration, document A may include a link to a location of document B in the source document database 104 (e.g., /<source_document_database_address>/<document_B_identifier>). After document B has been migrated to the target document database 106, the link rewriting agent 132 may modify the link in document A to reference a location of document B in the target document database 106 (e.g., /<target_document_database_address>/<document_B_identifier>). If the target document database 106 is located on a server in the cloud (e.g., in the cloud-based environment 134), the link rewriting agent 132 may directly modify the link in document A. If the target document database 106 is located on a server at a customer premises, the link rewriting agent 132 may place a link modification request in a queue (described in more detail in FIG. 3) and a customer premise based link rewriting process that has write permission to the target document database 106 may pull the request from the queue and modify the link in document A.

One or more of the migration application 102, the link discovery agent 116, the tracking service 118, or the link rewriting agent 132 may execute in a cloud-based environment 134 to reduce usage of client (e.g., enterprise) resources, such as client storage resources and client computational resources (e.g., processing power). In addition, the migration application 102, the link discovery agent 116, the tracking service 118, and the link rewriting agent 132 may operate substantially in parallel, such that links referencing a document may be updated while a document is being migrated and while links in another document are being identified.

A dashboard 136 may receive (or retrieve) information from the tracking service 118 and display the information associated with the migration of the documents and the migration of the links associated with each tenant. For example, for each tenant, the dashboard may display how many pending documents 138 are pending migration from the source document database 104, how many completed documents 140 have completed migration to the target document database 106, how many un-finalized links 142 (e.g., links referencing locations in the source document database 104), and how many finalized links 144 (e.g., links referencing locations in the target document database 106). The dashboard 136 may be displayed in a browser 146 or other type of application that is capable of displaying a graphical user interface (GUI).

To support migrating documents and document links for multiple clients, each of the clients 120, 122 may be assigned a unique key. For example, the first client 120 may be assigned a first key 148 and the Pth client 122 may be assigned a Pth key 150. The keys 148, 150 may be generated for each license of the migration application 102 and may be used as a partition key that is authenticated prior to the cloud-based environment 134 providing a client with access to the corresponding client tables.

Thus, the migration application 102 may migrate the documents 108, 110 from the source document database 104 to the target document database 106. During the migration, as each document is in the process of being migrated, the link discovery agent 116 may scan each document and identify links that reference other documents (e.g., documents stored in the source document database 104). The link discovery agent 116 may send the links to the tracking service 118 for storage in a data structure, such as a link table (e.g., one of the link tables 126, 130). During the migration process, while a document is being migrated (e.g., stored) in the target document database 106, the link rewriting agent 132 may identify links in the link table that reference the document (e.g., the links may reference the location of the document in the source document database 104) and rewrite the links to reference the location of the document in the target document database 106. For example, when migrating documents in a company (e.g., an enterprise) from Lotus® Notes to Microsoft® SharePoint, before migration, a link in a document may reference the source document database 104. To illustrate, the link may include notes://servername/database/view/document_id. After migration to a target document database 106 that is hosted in the cloud, the link in the document may include http://clouddomain/query/{document_id}.

For example, assume the source document database 104 includes three documents, document A, document B, and document C. Document A includes a first link to document B and a second link to document C. Document B does not include links to other documents. Document C does not include links to other documents. Documents A, B, and C are to be migrated from the source document database 104 to the target document database 106. During the migration process, the migration application 102 may select document A for migration. The link discovery agent 116 may examine (e.g., scan) document A and discover the first link (e.g., link 112) to document B and the second link (e.g., link 114) to document C. The link discovery agent 116 may verify that the first link and the second link are valid links. For example, the link discovery agent 116 may verify that the first and second links are not self-referencing (e.g., neither the first link nor the second link references document A), the first and second links reference documents that exist (e.g., in the source document database 104), etc. The link discovery agent 116 may send information about document A and information about the links (e.g., the first link and the second link) in document A to the tracking service 118. For example, the information about document A may include a source address (e.g., path) of document A, a destination address (e.g., path) to where document A will be migrated, etc. The information about the links in document A may include an identifier associated with document B, an identifier associated with document C, an address associated with document B, an address associated with document B, other information associated with the links included in document A, or any combination thereof.

The tracking system 118 may receive the information associated with document A and the information associated with the links in document A. The migration tracking system may store the information associated with document A in the first document table 124 (or other type of data structure) and store the information associated with the links (e.g., the links 112, 114) in document A in the first link table 126 (or other type of data structure).

The migration application 102 may select document B for migration. The link discovery agent 116 may scan document B and discover that document B does not include links to other documents. The link discovery agent 116 may send information (e.g., a document identifier, a source address, a destination address, other information related to document B, or any combination thereof) about document B to the tracking service 118. The tracking service 118 may receive the information associated with document B and may store the information associated with document B in the first document table 124.

After the tracking service 118 has migrated document B from the source document database 104 to the target document database 106, the tracking service 118 may mark a status (e.g., in the first document table 124) of document B as having been migrated. The link rewriting agent 132 may determine that document B has been migrated to the target document database 106 by checking the status of document B in the first document table 124 (or after receiving a message from the tracking service 118 indicating that document B has been migrated). In response, the link rewriting agent 132 may identify documents with links pointing to document B in the first link table 126 and modify the links in each of the documents to use the location of document B in the target document database 106. For example, the link rewriting agent 132 may determine, based on the first link table 126, that link A includes a link to document B, find document A, and update the link in document A based on the location of document B in the target document database 106. To illustrate, the link rewriting agent 132 may use the first document table 124 to determine whether document A has been migrated. The link rewriting agent 132 may find document A in the source document database 104 if document A has not been migrated. The link rewriting agent 132 may find document A in the target document database 106 if document A has been migrated. The link rewriting agent 132 may examine document A, identify the link in document A to document B, and modify the link to include the location of document B in the target document database 106. The process of modifying a link to include a location of a document that has been migrated to the target document database 106 may be referred to as finalizing the link.

The migration application 102 may select document C for migration. The link discovery agent 116 may scan document C and discover that document C does not include links to other documents. The link discovery agent 116 may send information (e.g., a document identifier, a source address, a destination address, other information related to document C, or any combination thereof) about document C to the tracking service 118. The tracking service 118 may receive the information associated with document C and may store the information associated with document C in the first document table 124.

After the tracking service 118 has migrated document C from the source document database 104 to the target document database 106, the tracking service 118 may mark a status (e.g., in the first document table 124) of document C as having been migrated. The link rewriting agent 132 may determine that document C has been migrated to the target document database 106 by checking the status of document C in the first document table 124 (or after receiving a message from the tracking service 118 indicating that document C has been migrated). In response, the link rewriting agent 132 may identify (e.g., using the first link table 126) documents with links pointing to document C and modify the links in each of the documents to use the location of document C in the target document database 106. For example, the link rewriting agent 132 may determine, using the first link table 126, that link A includes a link to document C, find document A, and update the link in document A based on the location of document C in the target document database 106. The link rewriting agent 132 may find document A (a) in the source document database 104 if document A has not been migrated or (b) in the target document database 106 if document A has been migrated. The link rewriting agent 132 may examine document A, identify the link in document A to document C, and modify (e.g., finalize) the link to include the location of document C in the target document database 106.

During the migration process, the first document table 124 may include one or more of (i) the information associated with document A, (ii) the information associated with document B, and (iii) the information associated with document C. The first link table 126 may include one or more of (i) information associated with the first link (e.g., the first link 112) in document A to document B and (ii) information associated with the second link (e.g., the Mth link 114, where M=2) in document A to document C.

Figure 2:
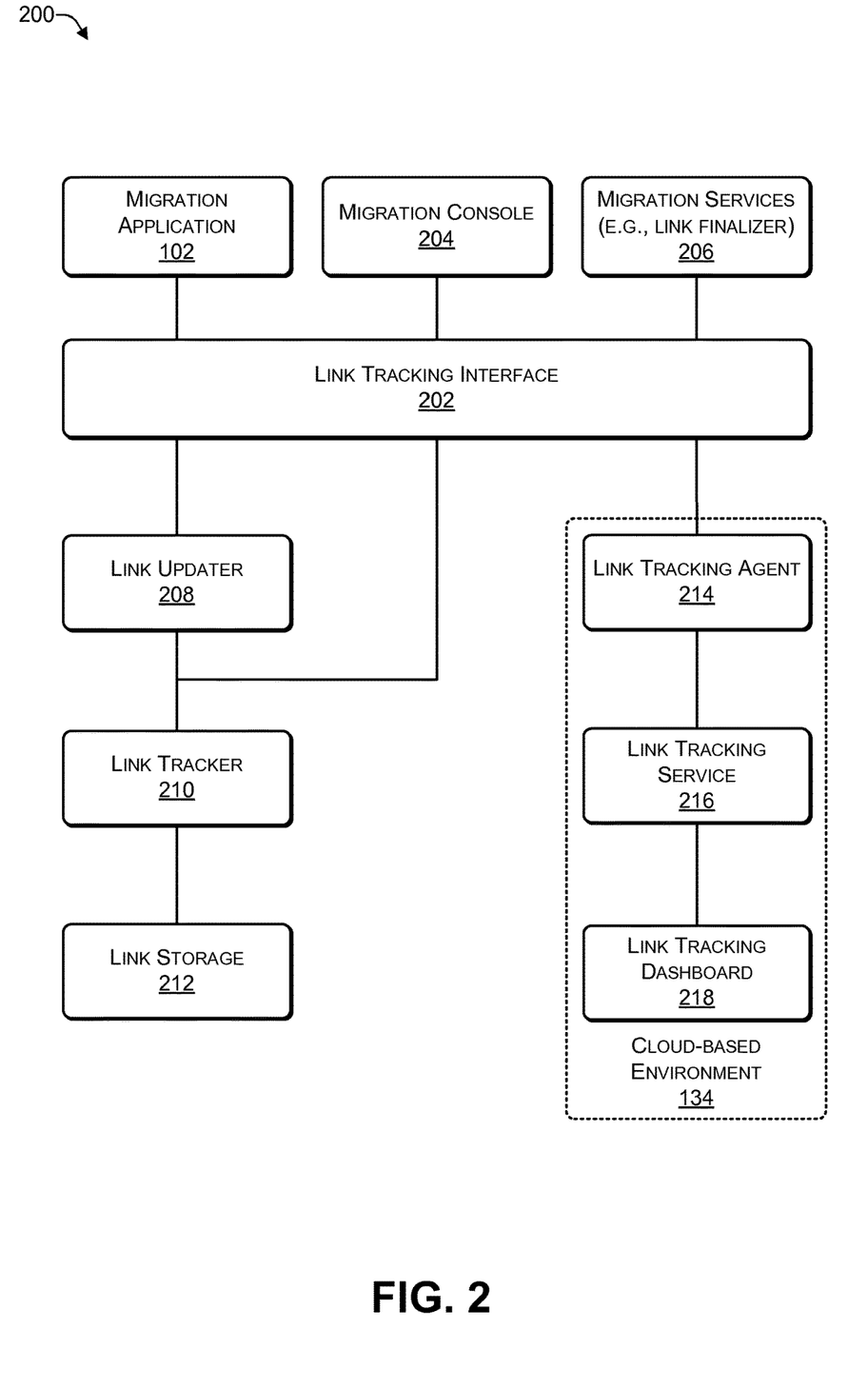
FIG. 2 is a block diagram illustrating an exemplary architecture to migrate links according to some embodiments.

FIG. 2 is a block diagram illustrating an exemplary architecture 200 to migrate links according to some embodiments. FIG. 2 illustrates components associated with tracking and finalizing document links when migrating documents from a source document database to a target document database.

A link tracking interface 202 may be a component of the tracking service 118 of FIG. 1. In some cases, the link tracking interface 202 may serve as an interface between the migration application 102 and link tracking services provided by the cloud-based environment 134. A migration console 204 may provide a GUI to enable a user to initiate and configure the migration process. Migration services 206 may provide various migration-related services.

A link updater 208 may be used to update links in a customer-premises based target document database. A link tracker 210 may be used to keep track of links by storing links and their corresponding status (e.g., un-finalized, finalized, etc.) in link storage 212. In some cases, the link updater 208 and the link tracker 210 may be components of the migration application 102.

To support the use of cloud-based link tracking, the cloud-based environment 134 may include a link tracking agent 214 (e.g., includes the link discovery agent 116 and the link rewriting agent 132 of FIG. 1), a link tracking service 216 (e.g., a component of the tracking service 118), and a link tracking dashboard 218 (e.g., a component of the dashboard 136). The link tracking agent 214 may have permissions to access a target document database hosted by a server located at a customer premises. The link tracking service 216 may comprise a Representational State Transfer (REST) based (e.g., "RESTful") service to maintain link tracking objects. The link tracking dashboard 218 may include web pages to display reports on the status of link migrations, e.g., how many links are finalized at a particular point in time, how many links are un-finalized at the particular point in time, etc.

Figure 3:
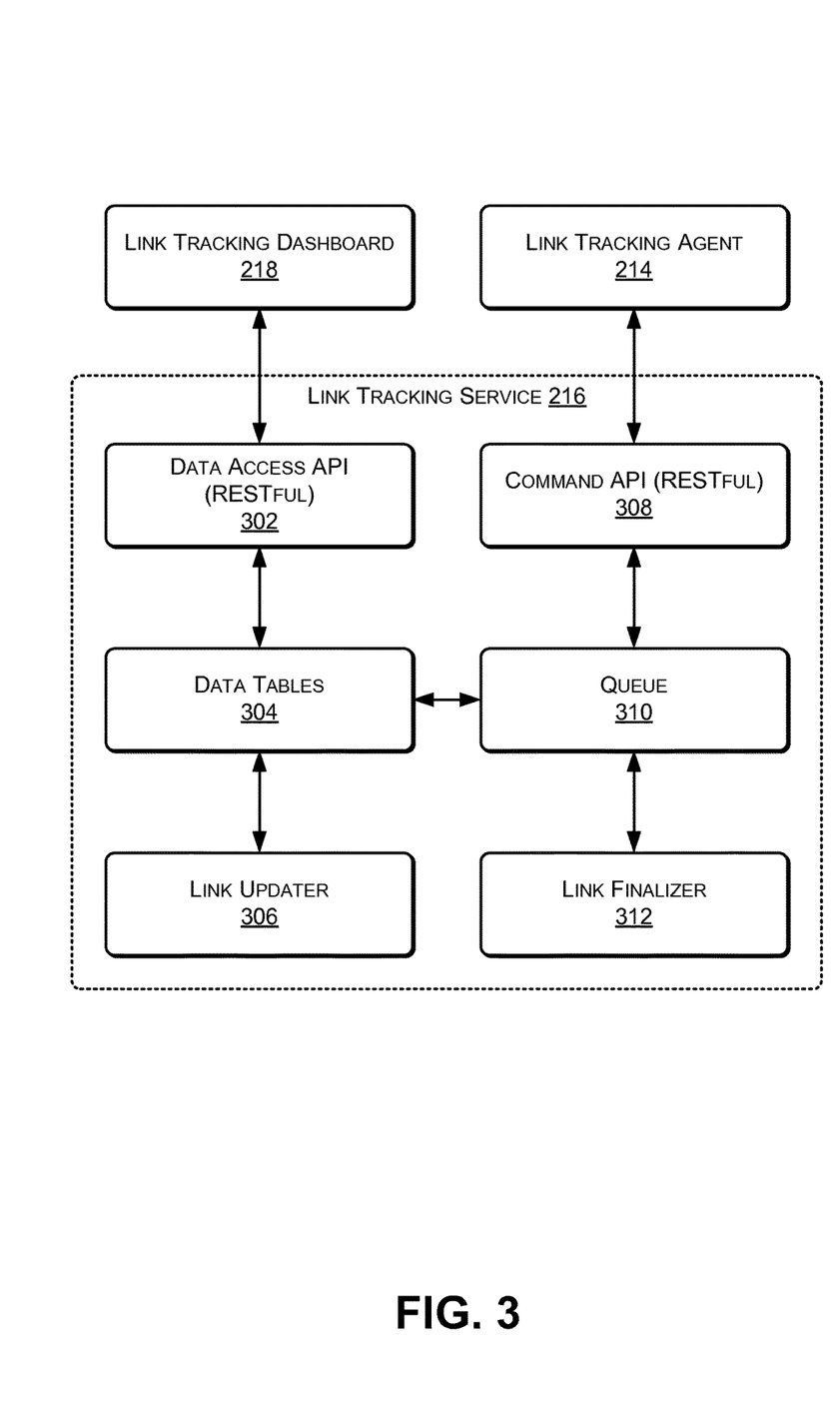
FIG. 3 is a block diagram illustrating an exemplary architecture of a link tracking service according to some embodiments.

FIG. 3 is a block diagram illustrating an exemplary architecture 300 of a link tracking service according to some embodiments. The link tracking dashboard 218 may use a data access application programming interface (API) 302 to access data tables 304 to determine information (e.g., a status) associated with links in documents that are being migrated. The data access API 302 may be implemented using a RESTful architecture. The data tables 304 may include one or more of tables 126, 130 of FIG. 1. A link updater 306 may update a status of the migration of links stored in the data tables 304. For example, after a link in document A that references document B has been updated to reference a location of document B in a target document database, the link updater 306 may update an entry in the data tables 304 to indicate that the link in document A has been updated.

The link tracking agent 214 may use a command API 308 to access a queue 310. The command API 308 may be implemented using a RESTful architecture. The link tracking agent 214 may track the progress of the migration of the links in documents. A link finalizer 312 may access the queue 310, identify a link in the queue 310 that is to be updated, update (e.g., finalize) the link, and update the queue 310 to indicate that the link in the queue has been finalized. For example, if the target document database is hosted by a server located in a customer premises, the link tracking agent 214 may lack permission to access document A in the customer premise based target document database to update a link that references document B. When document B has been migrated to the target document database, the link tracking agent 214 may place information associated with the link in document A to the migrated document in the queue 310 using the command API. The link finalizer 312 may access the queue 310, determine the information associated with the link in document A, and update the link in document A that is stored in the target document database.

Figure 4:
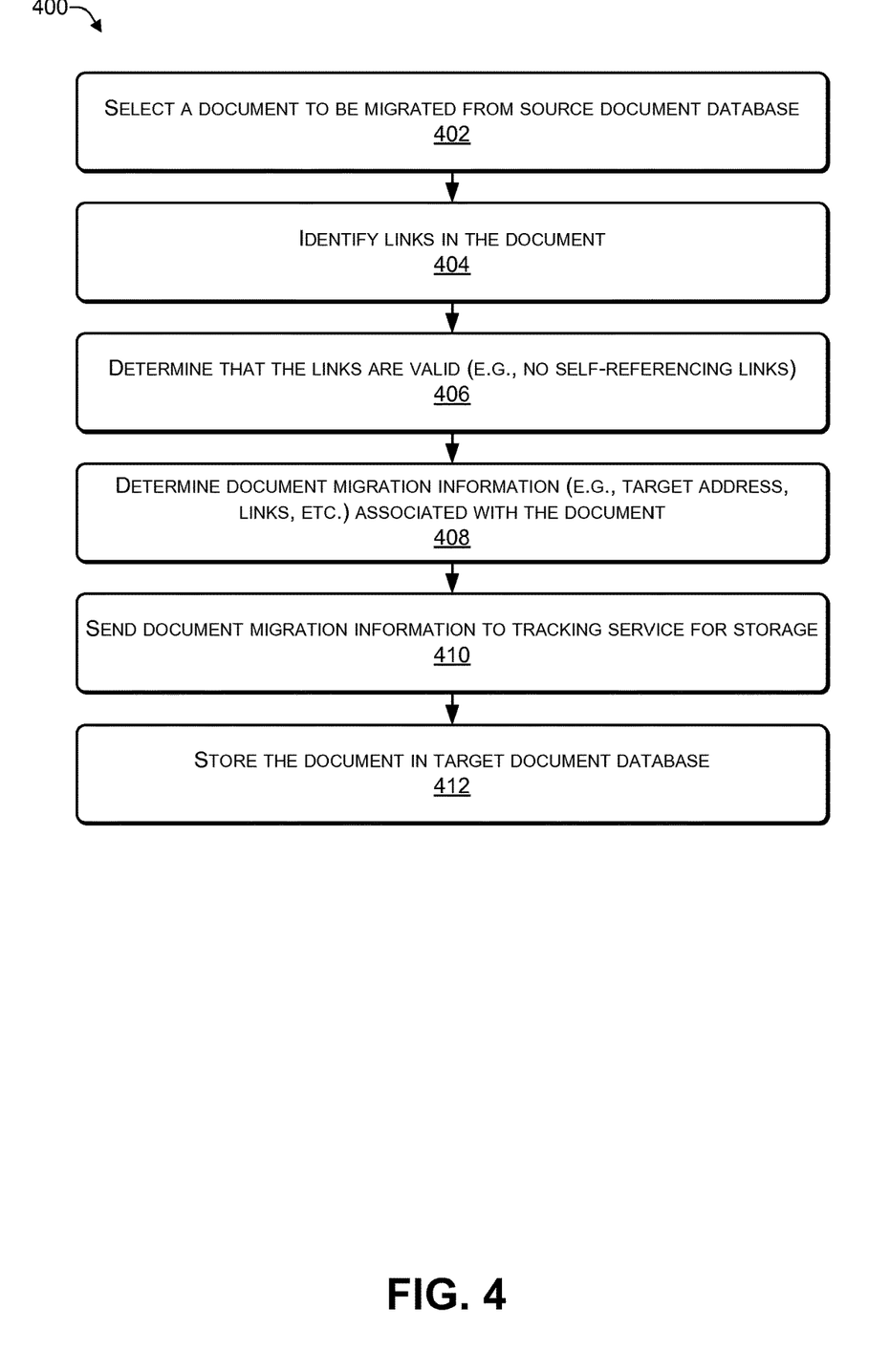
FIG. 4 is a flowchart of a process to identify links in a document according to some embodiments.
Figure 5:
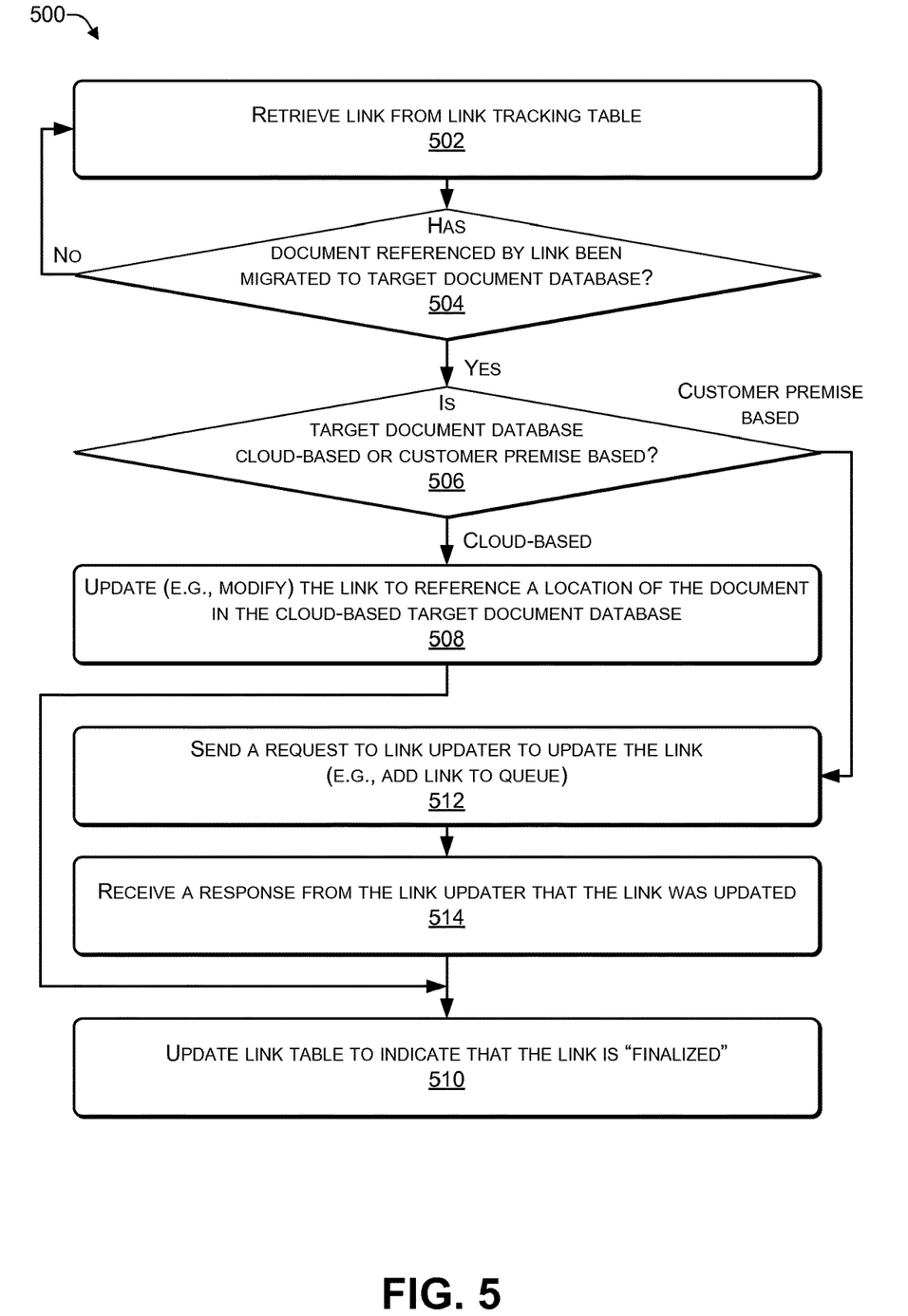
FIG. 5 is a flowchart of a process to finalize links in a document according to some embodiments.
Figure 6:
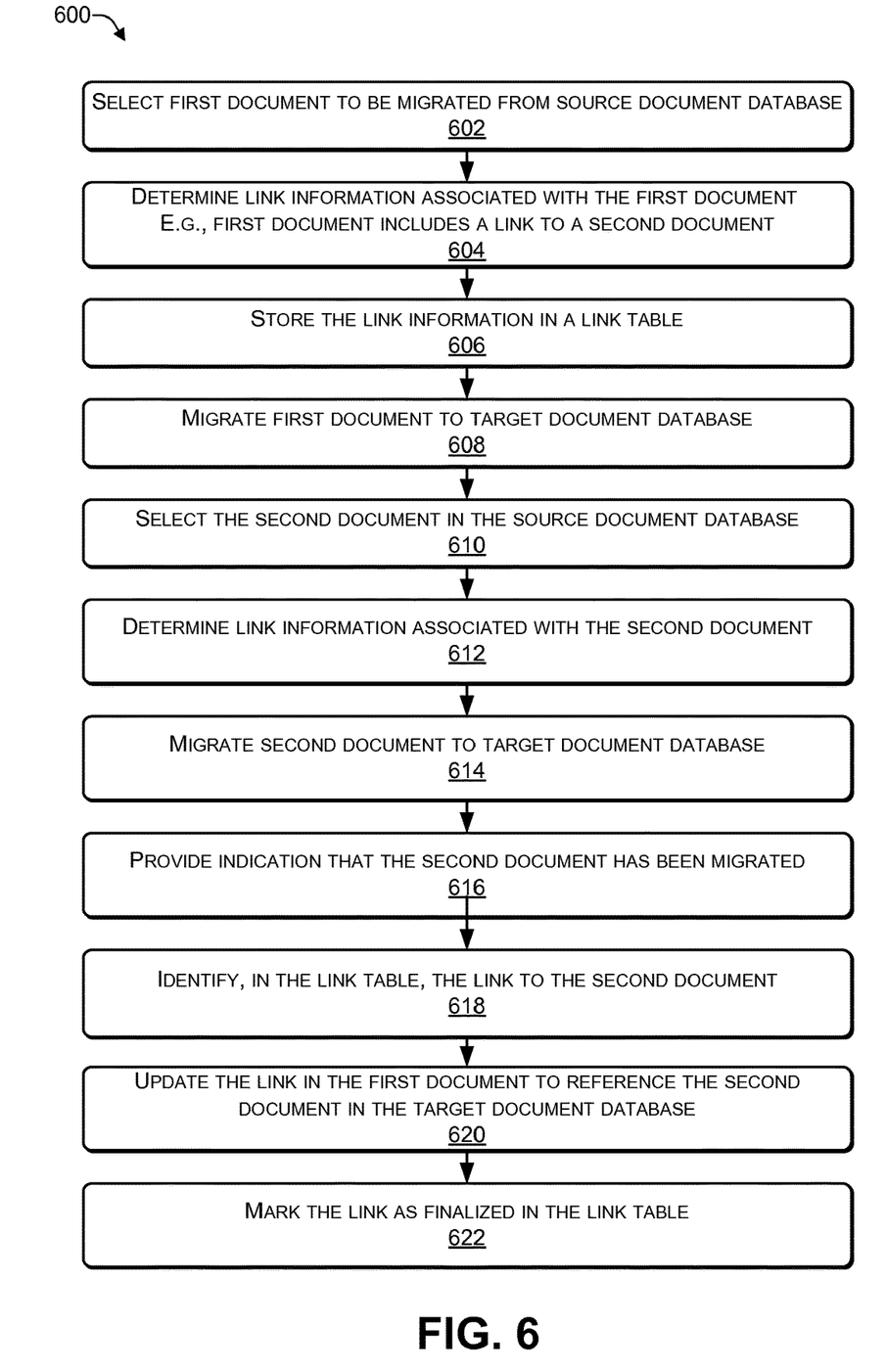
FIG. 6 is a flowchart of a process that includes storing a link in a link table according to some embodiments.

In the flow diagrams of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIG. 1, 2, or 3 as described above, although other models, frameworks, systems and environments may implement these processes.

FIG. 4 is a flowchart of a process 400 to identify links in a document according to some embodiments. The process 400 may be performed by a migration component of the architecture 100, such as the link discovery agent 116 of FIG. 1.

At 402, a document may be selected for migration from a source document database to a target document database. At 404, links in the document may be identified. At 406, a validity of the links in the document may be determined. For example, in FIG. 1, the first document 108 may be selected for migration. The link discovery agent 116 may examine (e.g., scan) the first document 108 and discover a link to the Nth document 110 (when N=2). The link discovery agent 116 may verify that the link is a valid link. For example, the link discovery agent 116 may verify that the link is not self-referencing (e.g., the link does not reference document A), the second document exists (e.g., the Nth document 110 exists in the source document database 104), etc.

At 408, document migration information associated with the document may be determined. At 410, the document migration information may be sent to a tracking service for storage. For example, in FIG. 1, the link discovery agent 116 may send information about the first document 108 and information about the link in the first document 108 to the tracking service 118. The information about the first document 108 may include a source address (e.g., path) of the first document 108 in the source document database 104, a destination address (e.g., of the target document database 106) where the first document 108 will be migrated, etc. The information about the link in the first document 108 may include an identifier associated with the Nth document 110, an address associated with the Nth document 110 other information associated with the link in the first document 108, or any combination thereof.

At 412, the document may be stored in a target document database. For example, in FIG. 1, the first document 108 may be stored in the target document database. The tracking service 118 may modify the first document table 124 to indicate that the first document 108 has been migrated from the source document database 104 to the target document database 106.

Thus, during the migration process, after a document from the source document database 104 is selected, the link discovery agent 116 may scan the document and identify links to other documents. The link discovery agent 116 may send the links to the tracking service 118 for storage in the link table 126. Information associated with the document, such as a document identifier and a target address of the document, may be sent to the tracking service 118 for storage in the document table 124. The link discovery agent 116 may operate substantially in parallel with the migration application 102 to enable links in the documents 108, 110 to be migrated in parallel with the migration of the documents, as compared to a conventional migration process. For example, in a conventional migration process, the documents 108, 110 may first be migrated from the source document database 104 to the target document database 106 and then links in each of the migrated documents may be discovered (e.g., identified) and finalized using the locations of the migrated documents. In contrast, the process 400 enables link discovery (and link finalizing) to be performed substantially in parallel with the migration of the documents.

FIG. 5 is a flowchart of a process 500 to finalize links in a document according to some embodiments. The process 500 may be performed by a migration component of the architecture 100, such as the link rewriting agent 132 of FIG. 1.

At 502, a link may be retrieved from a link tracking table. At 504, a determination may be made whether the document referenced by the link has been migrated to a target document database. In response to determining, at 504, that the document referenced by the link has not been migrated to the target document database (e.g., the document is in the source document database), the process proceeds to 502, where a next un-finalized link is retrieved from the link tracking table. In response to determining, at 504, that the document referenced by the link has been migrated to the target document database, the process proceeds to 506. For example, in FIG. 1, the link rewriting agent 132 may retrieve a link from one of the link tables 126, 130, and determine whether the document referenced by the un-finalized link has been migrated to (e.g., is stored in) the target document database 106. If the link rewriting agent 132 determines that the document referenced by the un-finalized link has not been migrated to the target document database 106 (e.g., the document is in the source document database 104), then the link rewriting agent 132 may retrieve a next link from the link tables 126, 130.

At 506, a determination is made whether the target document database is cloud-based or customer premise based. In response to determining, at 506, that the target document database is cloud-based, the link is updated to reference a location of the document in the cloud-based target document database, at 508, and the link table 126 or 130 is updated to indicate that the link is "finalized," at 510. For example, in FIG. 1, if the link rewriting agent 132 determines that an un-finalized link in the link tables 126, 130 references a document in the target document database 106 that is hosted by a cloud-based environment, the link rewriting agent 132 updates the link to reference the location of the document in the target document database 106 and marks the link in the link tables 126, 130 as "finalized."

In response to determining, at 506, that the target document database is customer premise based, the process may proceed to 512, where a request may be sent to a link updater to update the link. In some cases, the link rewriting agent 132 may place the link in a queue (e.g., the queue 310 of FIG. 3) to enable the link updater 306 to update the link because the link updater 306 may have write permission to update links in documents stored in the customer premise based target document database. For example, in FIG. 1, if the link rewriting agent 132 determines that an un-finalized link in the first link table 126 references a document in the target document database 106 that is hosted by a customer premises based server, the link rewriting agent 132 may send a message to the link updater 306 component of the link tracking service 216 to update the link. After receiving a response from the link updater 306 indicating that the link is updated, the link rewriting agent 132 may mark the link in the link tables 126, 130 as "finalized."

Thus, the link rewriting agent 132 may retrieve a link from the link tables 126, 130 and determine whether a document referenced by the link has been migrated. If the document has been migrated, the link may be updated with the location of the migrated document and the link marked as "finalized." If the link rewriting agent 132 has permission to access a particular document to update the link, then the link rewriting agent 132 may update the link. If the link rewriting agent 132 does not have permission to access a particular document to update the link (e.g., because the target document library is hosted by a customer premise based server), then the link rewriting agent 132 may cause a link updater to update the link, e.g., by placing the link in a queue. After the link updater indicates that the link has been updated, the link rewriting agent 132 may update the link tables 126, 130 to indicate that the link has been "finalized." The link rewriting agent 132 may operate substantially in parallel with the migration application 102 to enable links in the documents 108, 110 to be migrated in parallel with the migration of the documents, as compared to a conventional migration process. For example, in a conventional migration process, the documents 108, 110 may first be migrated from the source document database 104 to the target document database 106 and then links in each of the migrated documents may be discovered (e.g., identified) and finalized using the locations of the migrated documents. In contrast, the process 400 enables both link discovery and link finalizing to be performed substantially in parallel with the migration of the documents. For example, after the Nth document 110 is selected for migration, the link discovery agent 116 identifies the links in the Nth document 110 and stores them in one of the link tables 126, 130. After the Nth document 110 has been migrated, the link rewriting agent 132 identifies and finalizes the links that reference the Nth document 110.

FIG. 6 is a flowchart of a process 600 that includes storing a link in a link table according to some embodiments. The process 600 may be performed by one or more components of the architecture 100 of FIG. 1.

At 602, a first document may be selected for migration from a source document database (e.g., Lotus Notes®) to a target document database (e.g., SharePoint®). At 604, link information associated with the first document may be determined. For example, the first document may include a link to a second document. At 606, the link information may be stored in a link table. At 608, the first document may be migrated to the target document database. For example, in FIG. 1, the first document 108 may be selected for migration from the source document database 104 to the target document database 106. The link discovery agent 116 may discover the links 112, 114 in the first document 108 and send information associated with the links 112, 114 to the tracking service 118 for storage in one of the link tables 126, 130. For example, the first link 112 may reference the Nth document 110 (where N=2). After selecting the first document 108, the migration application 102 may migrate the first document 108 by storing the first document 108 in the target document database 106. In some cases, as part of the migration process, the migration application 102 may delete the first document 108 from the source document database 104.

At 610, the second document in the source document database may be selected. At 612, link information associated with the second document may be determined. At 614, the second document may be stored in (e.g., migrated to) the target document database. At 616, an indication may be provided that the second document has been migrated. For example, in FIG. 1, the migration application 102 may select the Nth document 110 for migration from the source document database 104 to the target document database 106. The link discovery agent 116 may identify links included in the Nth document 110 and send the links to the tracking service 118 for storage in one of the link tables 126, 130. The migration application 102 may migrate the Nth document 110 by storing the Nth document 110 in the target document database and may send a message to the tracking service 118 indicating that the Nth document 110 has been migrated. The tracking service 118 may modify one of the document tables 124, 128 to indicate that the Nth document 110 has been migrated.

At 618, information about the link to the second document may be determined based on the link table. At 620, the link in the first document may be updated to reference the second document's address in the target document database. At 622, the link may be marked as finalized in the link table. The link rewriting agent 132 may determine (e.g., based on an entry associated with the Nth document 110 in the document tables 124, 128) that the Nth document 110 has been migrated and identify links in one of the link tables 126, 130 that reference the Nth document 110. The link rewriting agent 132 may identify (e.g., based on the links in one of the link tables 126, 130) additional documents that include a link to the Nth document 110 and modify the links in the additional documents to include the location of the Nth document 110 in the target document database 106. For example, the first link 112 may reference the Nth document 110 and may include an address of the Nth document 110 in the source document database 104. The link rewriting agent 132 may determine (e.g., based on a link in one of the link tables 126, 130) that the Nth document 110 has been migrated to the source document database 104. The link rewriting agent 132 may determine that the first document 108 includes the first link 112 to the Nth document 110 and may modify the first link 112 in the first document 108 to include the location of the Nth document 110 in the source document database 104. If the target document database 106 is cloud-based, the link rewriting agent 132 may modify the first link 112 in the first document 108. If the target document database 106 is customer premise based, the link rewriting agent 132 may place the information associated with the first link 112 in a queue to enable a link updater process to update the first link 112. The link rewriting agent 132 may instruct the tracking service 118 to modify an entry in one of the link tables 126, 130 associated with the first link 112 to indicate that the first link 112 has been finalized.

Thus, after the migration application 102 has migrated a document by storing it in the target document database 106, the link rewriting agent 132 may identify particular documents that include links that reference the migrated document and modify the links in the particular documents to reference the location of the migrated document in the target document database 106. The link rewriting agent 132 may operate substantially in parallel with the migration application 102 to enable links in the documents 108, 110 to be migrated in parallel with the migration of the documents, as compared to a conventional migration process. For example, in a conventional migration process, the documents 108, 110 may first be migrated from the source document database 104 to the target document database 106 and then links in each of the migrated documents may be discovered (e.g., identified) and finalized using the locations of the migrated documents. In contrast, the process 400 enables both link discovery and link finalizing to be performed substantially in parallel with the migration of the documents. For example, after the Nth document 110 is selected for migration, the link discovery agent 116 identifies the links in the Nth document 110 and stores them in one of the link tables 126, 130. After the Nth document 110 has been migrated, the link rewriting agent 132 identifies and finalizes the links that reference the Nth document 110.

Figure 7:
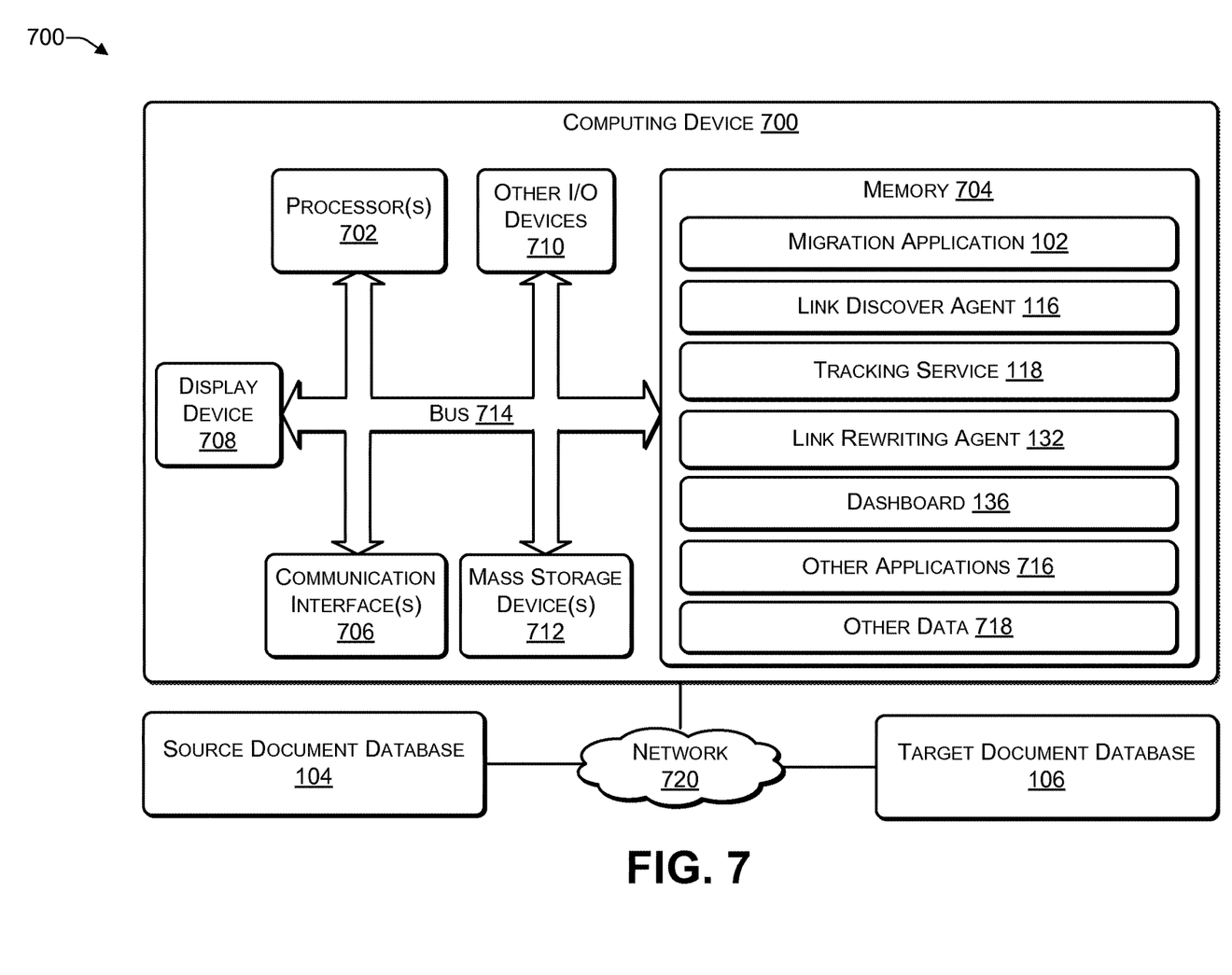
FIG. 7 illustrates an example configuration of a computing device that can be used to implement the systems and techniques described herein.

FIG. 7 illustrates an example configuration of a computing device 700 and environment that can be used to implement the modules and functions described herein. For example, the computing device 700 may be a server located at customer premises or a server of a cloud-based environment. The computing device 700 may include at least one processor 702, a memory 704, communication interfaces 706, a display device 708, other input/output (I/O) devices 710, and one or more mass storage devices 712, configured to communicate with each other, such as via a system bus 714 or other suitable connection.

The processor 702 may be a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 may generally include both volatile memory and non-volatile memory (e.g., RAM, ROM, or the like). Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a non-transitory media capable of storing computer-readable, processor-executable program instructions as computer program code that can be executed by the processor 702 as a particular machine configured for carrying out the operations and functions described in the implementations herein.

The computer storage media, such as memory 704 and mass storage devices 712, may be used to store software and data. The software applications and data may include the migration application 102, the link discovery agent 116, the tracking service 118, the link rewriting agent 132, the dashboard 136, other applications 716, and other data 718.

The computing device 700 may also include one or more communication interfaces 706 for exchanging data via a network 720. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 706 can also provide communication with external storage (not shown), such as in a storage array, network attached storage, storage area network, or the like.

A display device 708, such as a monitor, may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

Memory 704 may include modules and components for migrating documents and the links in each of the documents from the source document database 104 to the target document database 106. Memory 704 may include other data 718, such as data stored while performing the functions described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry), or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
    selecting a first document to migrate from a source document database;
    determining that the first document includes a link to a second document;
    verifying that the link to the second document is a valid link, wherein verifying that the link to the second document is a valid link includes verifying that the link is not self-referencing;
    selecting the second document to migrate from the source document database;
    migrating, by a migration agent, the second document to the target document database;
    modifying, by a link rewriting agent, the link in the first document to include an address of the second document in the target document database, wherein the link rewriting agent is configured to modify the link in the first document that references the second document while the migration agent is migrating the second document to the target document database;
    determining that second document includes zero links; and
    storing, in a link table, second link information associated with the zero links being included in the second document.

2. The computer-implemented method of claim 1, further comprising:
    migrating the first document to the target document database in parallel with selecting the second document to migrate from the source document database.

3. The computer-implemented method of claim 1, further comprising:
    updating, in a document table, an entry associated with the second document to indicate that the second document has been migrated to the target document database.

4. The computer-implemented method of claim 3, further comprising:
    modifying the link in the first document to include the address of the second document in the target document database based at least in part on determining that the second document has been migrated to the target document database.

5. The computer-implemented method of claim 1, wherein, after migrating the second document to the target document database, the method further comprises:
    indicating, in a link table, that the link in the first document has been finalized after modifying the link in the first document to include the address of the second document in the target document database.

6. The computer-implemented method of claim 1, wherein migrating the second document to the target document database comprises converting the second document from a first format to a second format that is different from the first format.

7. One or more non-transitory computer-readable media, comprising instructions that are executable by one or more processors to perform operations comprising:
    selecting a first document to migrate from a source document database;
    determining one or more links in the first document including a link to a second document;
    verifying that the link to the second document is a valid link, wherein verifying that the link to the second document is a valid link includes verifying that the link is not self-referencing;
    selecting the second document to migrate from the source document database;
    storing the second document in the target document database;
    modifying the link in the first document to include a location of the second document in the target document database, wherein the link in the first document that references the second document is modified while the second document is being migrated to the target document database;
    determining that second document includes zero links; and
    storing, in a link table, second link information associated with the zero links being included in the second document.

8. The one or more non-transitory computer-readable media of claim 7, the operations further comprising:
    determining that the first document includes the link to the second document in parallel with selecting the second document to migrate from the source document database.

9. The one or more non-transitory computer-readable media of claim 7, the operations further comprising:
    updating, in a document table, an entry associated with the second document to indicate that the second document has been migrated after migrating the second document to the target document database.

10. The one or more non-transitory computer-readable media of claim 7, the operations further comprising:
    indicating, in a link table, that the link in the first document has been finalized after modifying the link in the first document to include the address of the second document in the target document database.

11. The one or more non-transitory computer-readable media of claim 7, wherein:
    the source document database includes at least one document in a first format; and
    the target document database includes at least one document in a second format that is different from the first format.

12. A computing device, comprising:
    one or more processors; and
    one or more non-transitory computer-readable media storing instructions that are executable by the one or more processors to perform operations comprising:
    selecting a first document to migrate from a source document database;
    determining that the first document includes a link to a second document;
    verifying that the link to the second document is a valid link, wherein verifying that the link to the second document is a valid link includes verifying that the link is not self-referencing;
    selecting the second document to migrate from the source document database;

migrating the second document to the target document database;

modifying the link in the first document to include an address of the second document in the target document database, wherein the link in the first document that references the second document is modified while the second document is being migrated to the target document database;

determining that second document includes zero links; and storing, in a link table, second link information associated with the zero links being included in the second document.

13. The computing device of claim 12, wherein migrating the second document to the target document database comprises converting the second document from a first format to a second format.

14. The computing device of claim 12, wherein the source document database includes at least one of a word processing document, a spreadsheet document, a presentation document, or an electronic mail (email) document.

15. The computing device of claim 12, further comprising:

modifying the link in the first document to include the address of the second document in the target document database based at least in part on determining that the second document has been migrated to the target document database.

16. The computing device of claim 12, wherein, after migrating the second document to the target document database, the operations further comprise:

indicating, in a link table, that the link in the first document has been finalized after modifying the link in the first document to include the address of the second document in the target document database.

17. The computing device of claim 12, further comprising:

selecting a third document to migrate from the source document database;

migrating the third document to the target document database; and modifying a link in the first document to include an address of the third document in the target document database.

18. The computing device of claim 17, wherein the selecting, the migrating and the modifying are performed substantially in parallel.

* * * * *